United States Patent
Tran (10) Patent No.: US 7,894,435 B2
(45) Date of Patent: Feb. 22, 2011

(54) INDICATOR PACKETS FOR PROCESS/FORWARD DECISION

(75) Inventor: Matthew P. Tran, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1011 days.

(21) Appl. No.: 11/531,976

(22) Filed: Sep. 14, 2006

(65) Prior Publication Data

US 2008/0069103 A1    Mar. 20, 2008

(51) Int. Cl.
*H04L 12/28* (2006.01)
*H04L 12/56* (2006.01)

(52) U.S. Cl. ..................................................... 370/392
(58) Field of Classification Search ................... 370/392
See application file for complete search history.

(56) References Cited

U.S. PATENT DOCUMENTS

| | | | |
|---|---|---|---|
| 4,236,245 A | | 11/1980 | Freeny et al. |
| 5,227,907 A | | 7/1993 | Rao et al. |
| 5,848,059 A | * | 12/1998 | Yamamoto .................. 370/258 |
| 6,044,076 A | * | 3/2000 | Yamamoto .................. 370/392 |
| 6,122,274 A | * | 9/2000 | Kumar ........................ 370/388 |
| 7,464,174 B1 | * | 12/2008 | Ngai ............................ 709/234 |
| 2002/0009049 A1 | | 1/2002 | Nomura |
| 2002/0176425 A1 | | 11/2002 | Aoki |
| 2003/0189496 A1 | | 10/2003 | Tran |
| 2004/0052259 A1 | * | 3/2004 | Garcia et al. ................ 370/392 |
| 2004/0100987 A1 | | 5/2004 | Marque-Pucheau |
| 2005/0129021 A1 | * | 6/2005 | Kumar et al. ............... 370/392 |
| 2005/0270974 A1 | * | 12/2005 | Mayhew ..................... 370/229 |
| 2006/0182112 A1 | * | 8/2006 | Battle et al. ................. 370/392 |
| 2006/0193257 A1 | * | 8/2006 | Behzadi ...................... 370/230 |

OTHER PUBLICATIONS

ANSI/IEEE Std 802.5-1998E(R2003) Part 5: Token ring access method and Physical Layer specifications Published May 26, 1998 ISBN 1-55937-960-X IEEE Document No. SH94536 IEEE Standards Board, 445 Hoes Lane, Piscataway, NJ.*
Federal Standard 1037C Published Aug. 7, 1996 Available from the Department of Commerce Available from the web via popular search engines http://www.its.bldrdoc.gov/fs-1037/fs-1037c.htm.*
IEEE Standard for Scalable Coherent Interface (SCI), IEEE Std 1596-1992, Mar. 19, 1992, pp. 1-255, IEEE, New York, NY.
Weffers-Albu et al., NCS Calculation Method for Streaming Applications, Proceedings of the 5th Progress Symposium on Embedded Systems, Sep. 2004, pp. 1-7.
PCI Express, Wikipedia, Aug. 7, 2006, pp. 1-5, <en.wikipedia.org/wiki/PCI_Express>.
Bhatt, Creating a Third Generation I/O Interconnect, Intel® Developer Network for PCI Express* Architecture, Sep. 13, 2006, pp. 1-11.

* cited by examiner

*Primary Examiner*—Daniel Wu
*Assistant Examiner*—Frederick Ott
(74) *Attorney, Agent, or Firm*—Marger Johnson & McCollom, P.C.

(57) ABSTRACT

A first interconnect agent may append indicator packets to a normal packet depending on the destination of the normal packet. A second interconnect agent may receive packets from the first agent over a first point-to-point link. Logic in the second agent may interpret the number of indicator packets, if any, to decide whether a normal packet received over the first link should be processed at the second agent or forwarded over a second point-to-point link.

16 Claims, 6 Drawing Sheets

INDICATOR PACKETS FOR PROCESS/FORWARD DECISION

BACKGROUND

Figure 1:
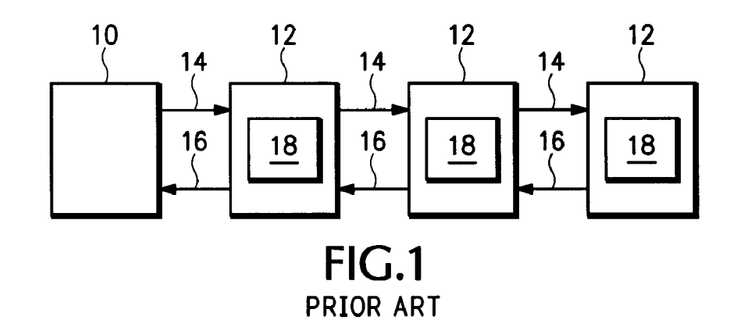
FIG. 1 illustrates a prior art memory interconnect system

FIG. 1 illustrates a prior art memory interconnect system that includes a memory controller 10 and one or more memory modules 12 that communicate through a channel made up of point-to-point links. The channel has an outbound path that includes one or more outbound links 14, and an inbound path that includes one or more inbound links 16. Each module redrives signals from link to link on the outbound path and from link to link on the inbound path. Each module may also process any request sent by the memory controller. Each module may also be capable of selectively disabling any redrive features, for example, if the module detects that it is the outermost module, or in response to a command from the memory controller.

Each module includes one or more memory devices 18 arranged to transfer data to and/or from one or more of the paths. For example, a module may be arranged such that data from the outbound path is transferred to a memory device, and data from the memory device is transferred to the inbound path. One or more buffers may be disposed between one or more memory devices and one or more of the paths. The memory devices may be read only memory (ROM), dynamic random access memory (DRAM), flash memory, etc.

Figure 2:
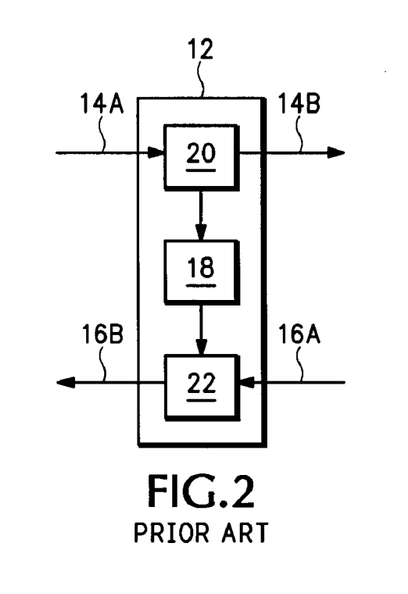
FIG. 2 illustrates a prior art memory module.

FIG. 2 illustrates a prior art memory module 12 that includes two redrive circuits 20 and 22 to receive signals on links 14A and 16A, and redrive the signals on links 14B and 16B, respectively. One or more memory devices 18 are arranged to transfer data to and/or from one or more of the redrive circuits.

If the module of FIG. 2 is used in a memory system such as that shown in FIG. 1, then redrive circuit 20 might be designated as an outbound redrive circuit and arranged to receive and redrive signals on an outbound path including links 14A and 14B, and the other redrive circuit 22 might be designated as an inbound redrive circuit and arranged to receive and redrive signals on an inbound path including links 16A and 16B. One or more memory devices 18 may be arranged so that data is transferred from the outbound redrive circuit 20 to the memory device(s) and from the memory device(s) to the inbound redrive circuit 22.

Figure 3:
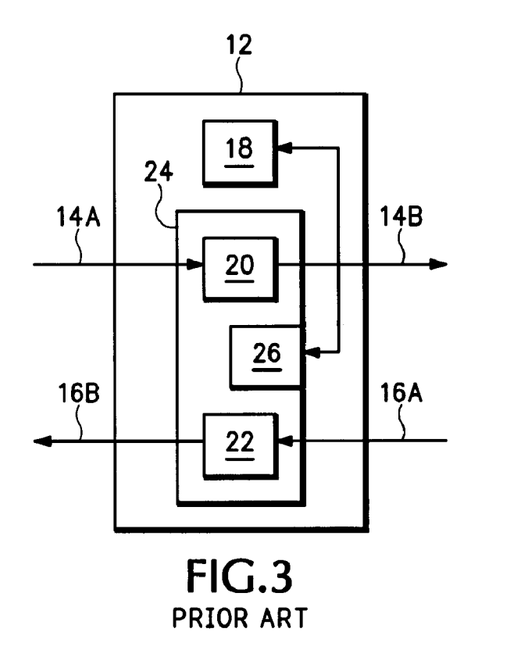
FIG. 3 illustrates another prior art memory module.

FIG. 3 illustrates another prior art memory module. The module 12 of FIG. 3 includes a memory buffer 24 having two redrive circuits 20 and 22 to receive signals on links 14A and 16A, and redrive the signals on links 14B and 16B, respectively. The memory buffer also includes a memory interface 26 arranged to transfer data to and from one or more memory devices 18.

If the module of FIG. 3 is used in a memory system such as that shown in FIG. 1, then redrive circuit 20 might be designated as an outbound redrive circuit and arranged to receive and redrive signals on an outbound path including links 14A and 14B, and the other redrive circuit 22 might be designated as an inbound redrive circuit and arranged to receive and redrive signals on an inbound path including links 16A and 16B.

Figures 4, 5:
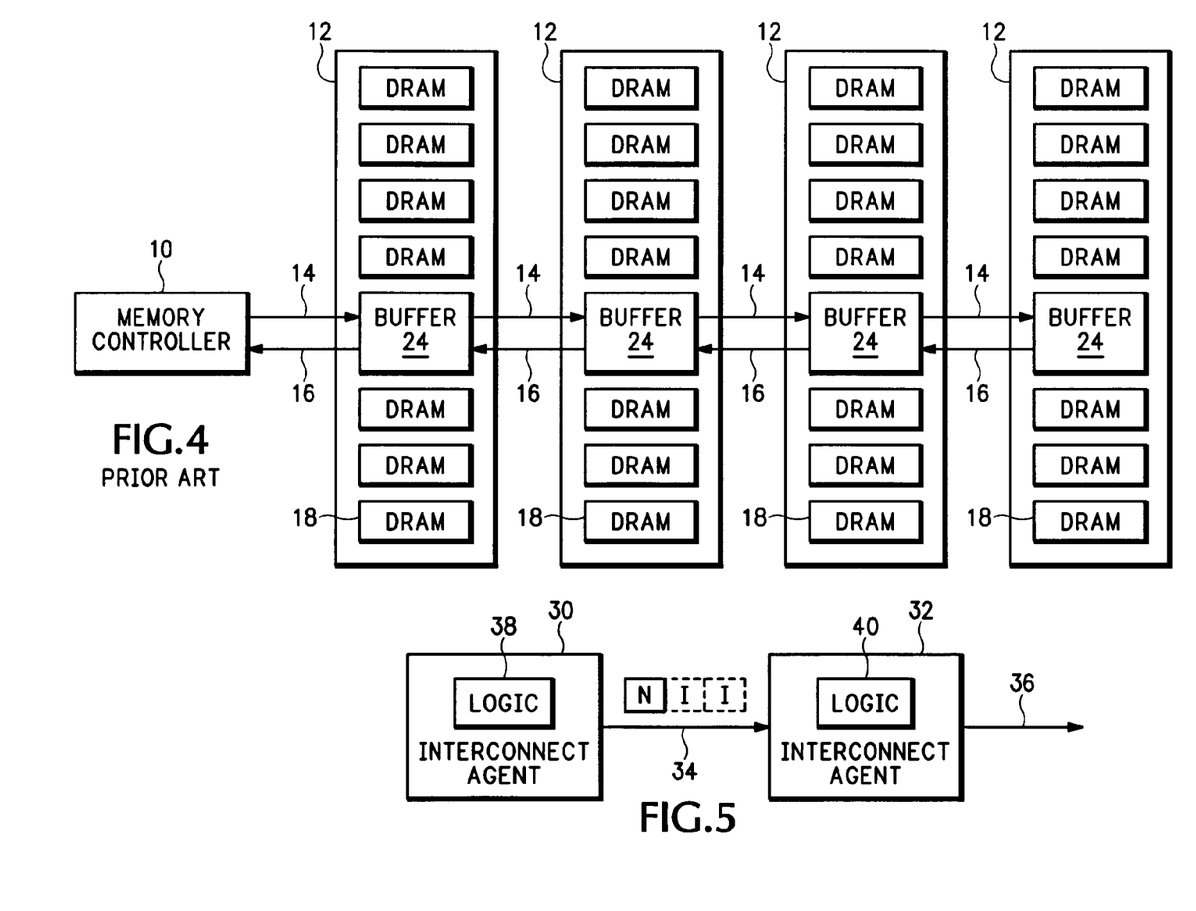
FIG. 4 illustrates another prior art memory interconnect system.
FIG. 5 illustrates an embodiment of an interconnect system according to some of the inventive principles of this patent disclosure.

FIG. 4 illustrates another prior art memory interconnect system with memory modules 12 and memory buffers 24. The modules are populated with memory devices 18, for example, commodity-type DRAM such as Double Data Rate II (DDR2) DRAM and arranged in a dual inline memory module (DIMM) configuration. A memory buffer 24 on each module isolates the memory devices from a channel that interfaces the modules to the memory controller 10, which is also referred to as a host. The channel is wired in a point-to-point arrangement with an outbound path that includes outbound links 14, and an inbound path that includes inbound links 16. The links may be implemented with parallel bit lanes using low-voltage differential signals.

In the system of FIG. 4, no additional signal lines are used for functions such as command, reset, initialization, and the like. Instead, these functions are encoded directly in the data sent over the channel. Memory systems implementing these features are being deployed under the name Fully Buffered DIMM or FBDIMM.

The host may initiate data transfers by sending packets to the innermost module on the outbound path. The innermost module receives and redrives the data to the next module on the outbound path. Each module receives and redrives the outbound data until it reaches the outermost module. Although the outermost module could attempt to redrive the data to a "nonexistent" outbound link, each module may be capable of detecting (or being instructed) that it is the outermost module and disabling any redrive circuitry to reduce unnecessary power consumption, noise, etc. Each module processes every data packet it receives, regardless of whether the packet is intended for the module, or destined for another module further down the outbound path. Data transfers in the direction of the host, i.e., inbound, are initiated by the module that contains the requested data. Each module between the host and module that contains the requested data receives and redrives inbound data along the inbound path until reaches the host.

DETAILED DESCRIPTION

FIG. 5 illustrates an example embodiment of an interconnect system 30 according to some of the inventive principles of this patent disclosure. The embodiment of FIG. 1 includes a first interconnect agent 30 connected to a second interconnect agent 32 through a first point-to-point link 34. The second agent may be connected to a third agent through a second point-to-point link 36, and additional agents may be connected through additional links. The first agent includes logic 38 to append indicator packets to normal packets depending on the destination of the normal packet. For example, the first agent may append any number of indicator packets I to a normal packet N shown in FIG. 5 prior to sending it over the first link to designate the destination of the normal packet. The second agent includes logic 40 to examine incoming packets to decide whether a normal packet received over the first link should be processed at the second agent or forwarded over the second link to another agent.

The embodiment shown in FIG. 5 may be implemented in any type of environment that utilizes point-to-point interconnects. For example, the interconnect agents may be implemented as processors in a multiprocessor environment, or as bridges or hubs between a processor and memory and input/output subsystems. In the context of a memory system, the first interconnect agent may be implemented as part of a memory controller (or host), while the other agents may be realized as memory modules or buffers, e.g., in an FBDIMM system. As a further example, the inventive principles illustrated through the embodiment of FIG. 5 may also be implemented in the context of a PCI Express (PCIe) interface.

FIGS. 6 through 9 illustrate example embodiments of interconnect systems, components, and packet transfers according to some of the inventive principles of this patent disclosure. For purposes of illustration, the embodiments of FIGS. 6 through 9 are shown with a first interconnect agent 42 designated as a host, and four additional agents 44 through 50 designated as modules M1 through M4. The host and modules are connected in series through outbound links 52 and inbound links 54. However, the inventive principles are not limited to this particular arrangement.

Figure 6:
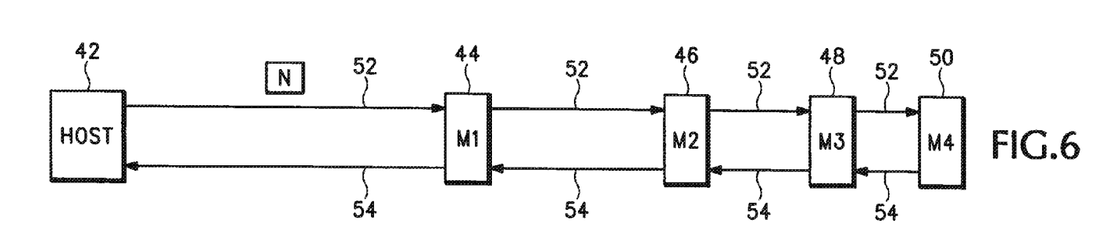
FIGS. 6 through 9 illustrate example embodiments of interconnect systems, components, and packet transfers according to some of the inventive principles of this patent disclosure.

FIG. 6 illustrates an example in which a normal packet N is intended for the first module M1. The host transmits the normal packet to M1 with no indicator packets appended. The logic in M1 interprets the lack of an indicator packet to mean that the normal packet is intended for M1. Thus, the normal packet is processed in M1.

Figure 7:
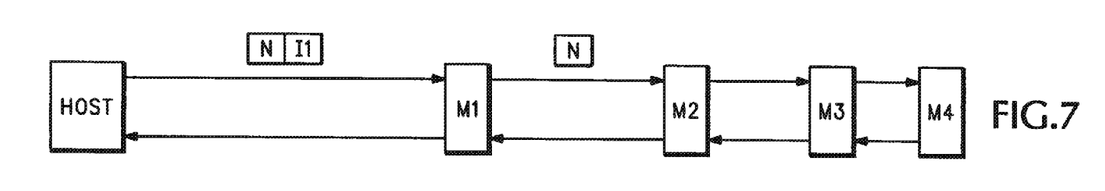

FIG. 7 illustrates an example in which a normal packet is intended for the second module M2. The host transmits the normal packet to M1 with one indicator packet I1 appended. When the logic in M1 encounters the indicator packet I1, it aborts processing the indicator packet and forwards the next packet, which in this case is a normal packet, to M2. Thus, the normal packet N is received at M2 with no indicator packets. The logic in M2 interprets the lack of an indicator packet to mean that the normal packet is intended for M2, and therefore, the normal packet is processed in the second module M2.

Figure 8:
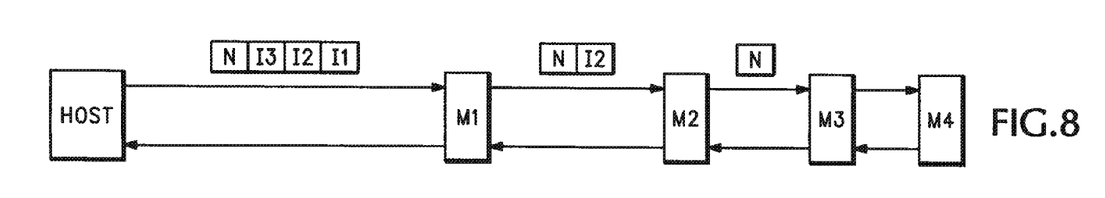

FIG. 8 illustrates an example in which a normal packet is intended for the third module M3. The host transmits the normal packet to M1 with three indicator packets I1-I3 appended. Upon receiving the first indicator packet I1, the first module aborts I1, then forwards the second indicator packet I2 to the second module M2. Upon receiving the third indicator packet I3, the first module aborts I3, then forwards the normal packet N to the second module. Thus, the second module only sees packet I2 followed by packet N.

Upon receiving I2, the second module aborts I2, then forwards the normal packet N to the third module M3. Seeing no indictor packets appended, M3 processes the normal packet without forwarding any packets to the forth module M4.

Figure 9:
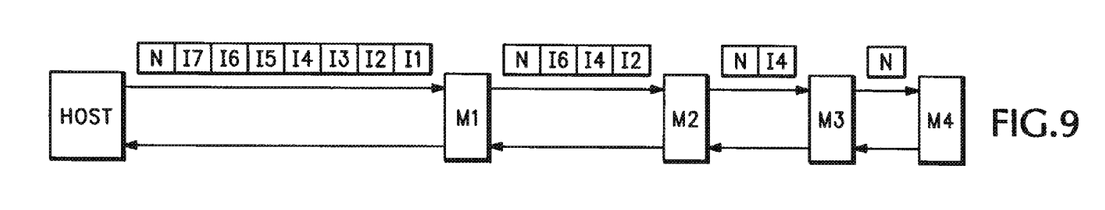

FIG. 9 illustrates an example in which a normal packet is intended for the fourth module M4. The host transmits the normal packet to M1 with seven indicator packets I1-I7 appended. The normal and indicator packets are forwarded along the links as indicator packets are progressively stripped in the same manner described above until the normal packet arrives at the fourth module without any indicator packets. The fourth module M4 then processes the normal packet.

The principles described above may be implemented with any number of agents, in which case the number of indicator packets may be expressed as $2^{k-1}-1$, where k is the number of the destination agent (or number of links between the host and destination agent). Stated otherwise, the number of indicator packets appended by the host may be equal to $2^m-1$, where m is the number of forwarding agents between the sending agent and the destination agent.

Figure 10:
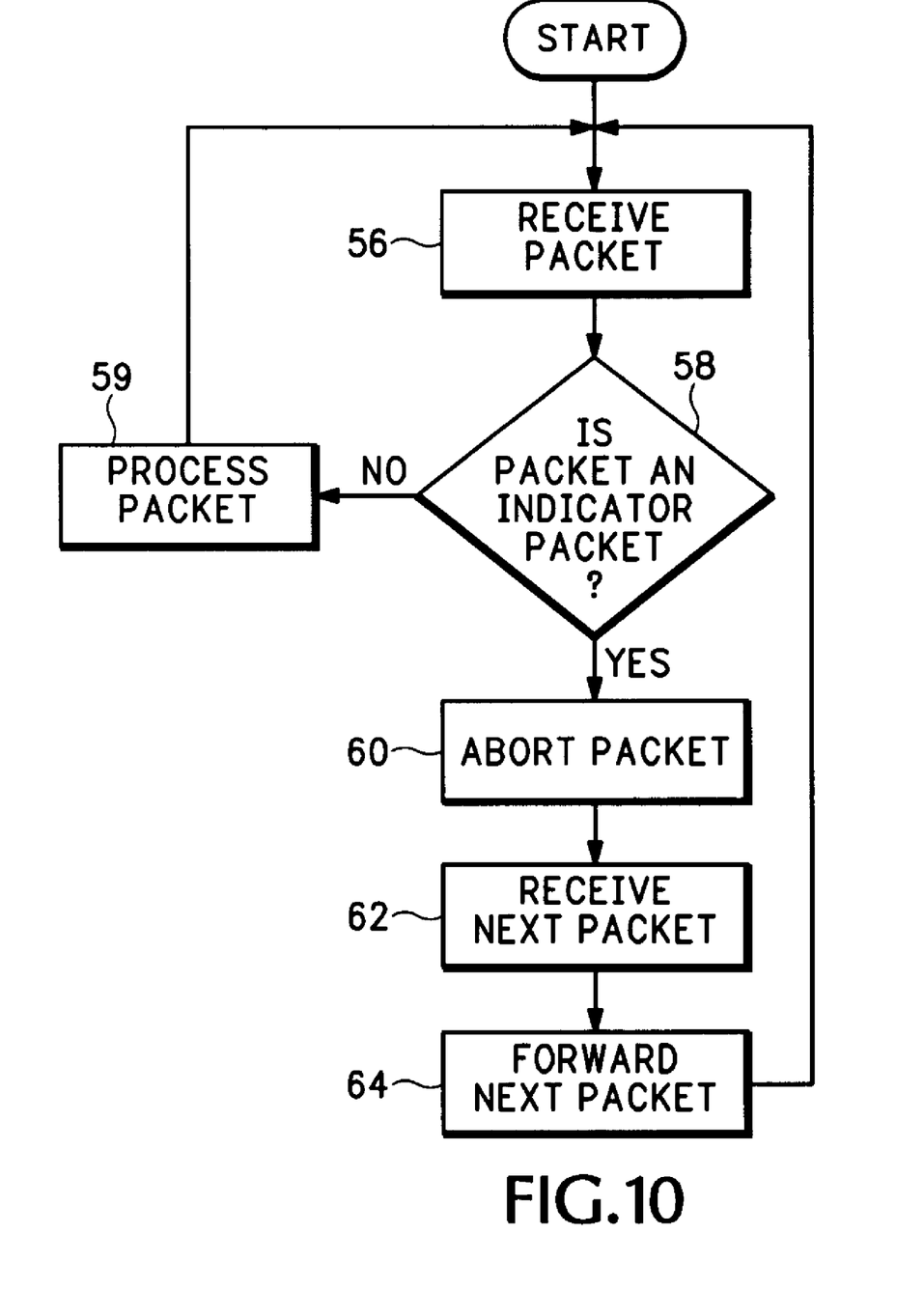
FIG. 10 illustrates an example embodiment of a method for interpreting or decoding indicator packets according to some of the inventive principles of this patent disclosure.

FIG. 10 illustrates an example embodiment of a method for interpreting or decoding indicator packets according to some of the inventive principles of this patent disclosure. The embodiment of FIG. 10 may be implemented, for example, by the agents 44 through 50 in the examples of FIGS. 6-9. Beginning at 56, the agent receives a packet. At 58, the agent determines whether the received packet is a normal packet or an indicator packet. If the packet is a normal packet, the agent processes the packet at 59, then returns to the beginning. If the packet is an indicator packet, the agent aborts processing the packet at 60, receives the next packet at 62, and then forwards the next packet to the next agent at 64 before returning to the beginning.

Figures 11, 12:
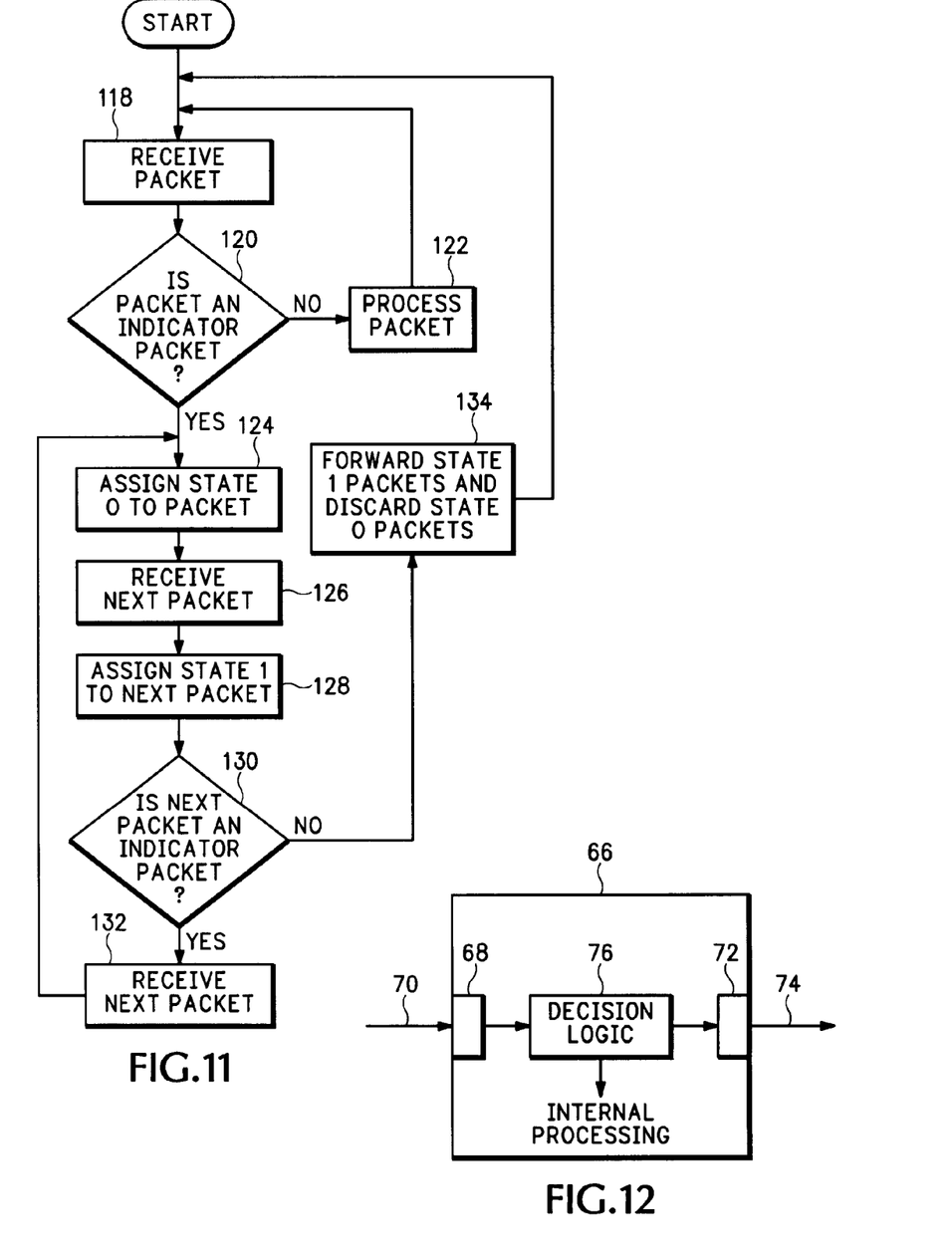
FIG. 11 illustrates another embodiment of a method for interpreting or decoding indicator packets according to some of the inventive principles of this patent disclosure.
FIG. 12 illustrates an embodiment of an interconnect agent capable of processing or forwarding packets according to some of the inventive principles of this patent disclosure.

FIG. 11 illustrates another embodiment of a method for interpreting or decoding indicator packets according to some of the inventive principles of this patent disclosure. In this embodiment, the logic may assign either a first or second logic state (e.g., a logic 0 or 1) to all incoming packets when a first indicator packet is detected. A first indicator packet may be interpreted, for example, as an indicator packet that trails a previous normal packet. Additional logic may then forward all packets having the first logic state and ignore all packets having the second logic state.

Referring to FIG. 11, a packet is received at 118. At 120, the agent determines whether the received packet is a normal packet or an indicator packet. If the packet is a normal packet, the agent processes the packet at 122, then returns to the beginning. If the packet is an indicator packet, the agent automatically assigns state 0 to the current packet (124), receives the next packet (126) and assigns state 1 to the next packet (128). At 130 the agent decides whether the next packet is an indicator packet or a normal packet. If it is a normal packet, the agent knows it has reached the end of the string of indicator packets, so at 134 it forwards all state 1 packets and discards all state 0 packets. If, however, the next packet is another indicator packet, the agent continues the loop at 124 until it reaches the normal packet. In such an embodiment, the total number of packets (from the first indicator packet to the normal packet) is an even number since there is an odd number of indicator packets ($2^m-1$) plus the normal packet.

FIG. 12 illustrates an embodiment of an interconnect agent 66 capable of processing or forwarding packets according to some of the inventive principles of this patent disclosure. This embodiment includes a first link interface 68 to receive packets over a first point-to-point link 70, and a second link interface 72 to transmit packets over a second point-to-point link 74. The agent also includes decision logic 76 to decide whether a normal packet received over the first link should be processed at the agent or forwarded over the second link in response to indicator packets that may accompany the normal packets. For example, the logic may adopt a "next packet" forwarding technique in response to an indicator packet as described above with respect to the embodiments of FIGS. 6-10, but other indicator packet encoding and interpretation techniques may also be used.

Figure 13:
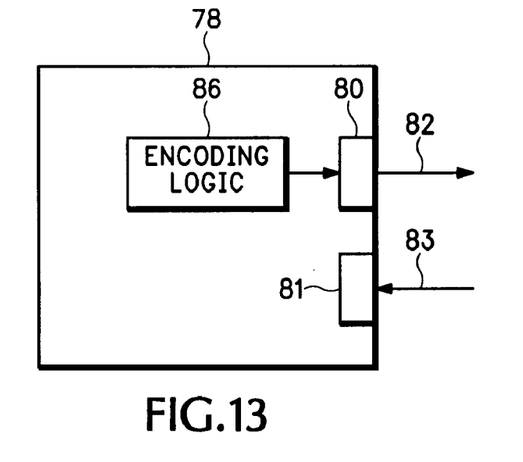
FIG. 13 illustrates an embodiment of an interconnect agent capable of appending indicator packets according to some of the inventive principles of this patent disclosure.

FIG. 13 illustrates an embodiment of an interconnect agent 78 capable of appending indicator packets according to some of the inventive principles of this patent disclosure. This embodiment includes a link interface 80 to transmit packets over a point-to-point link 82. The agent also includes encoding logic 86 to append indicator packets to a normal packet to indicate the destination of the normal packet. For example, the logic may adopt an encoding technique to accommodate forwarding agents that implement a "next packet" forwarding technique in response to an indicator packet as described above with respect to the embodiments of FIGS. 6-10, but other indicator packet encoding and interpretation techniques may also be used. The agent may further include a second link interface 81 to receive packets over a second point-to-point link 83.

The embodiments of FIGS. 12 and 13 may be used to implement forwarding agents and hosts, respectively, in system like the ones disclosed in FIGS. 5-9, and many variations are possible according to the inventive principles of this patent disclosure. For example, the interconnect agents may include additional link interfaces to connect to more agents and to provide communication in additional directions. A single agent may also include logic to both append and interpret indicator packets.

In some embodiments, indicator packets, which may be substantially smaller than normal packets, may be implemented as empty packets. In some embodiments, an empty packet may include only a start bit and an end bit.

Figure 15:
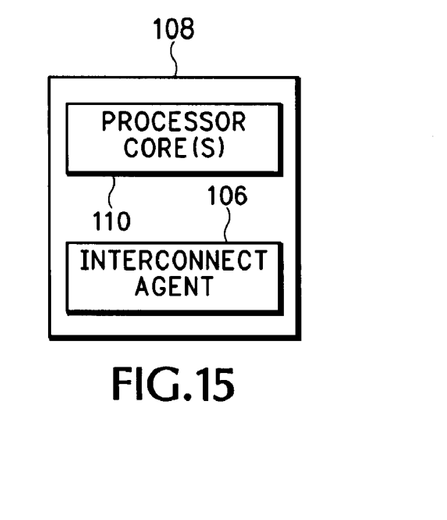
FIG. 15 illustrates an embodiment of a system having an interconnect agent according to some of the inventive principles of this patent disclosure.
Figure 16:
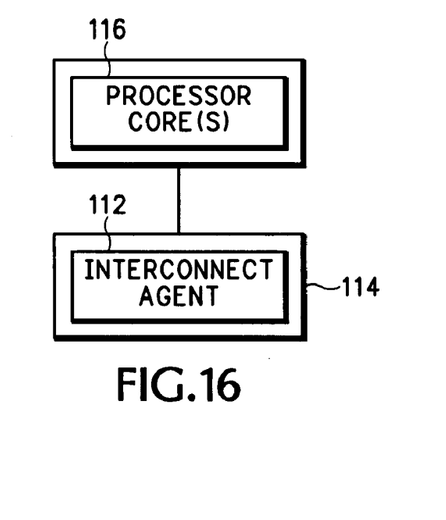
FIG. 16 illustrates another embodiment of a system having an interconnect agent according to some of the inventive principles of this patent disclosure.

Embodiments of interconnect agents may be configured with other system components in various ways according to the inventive principles of this patent disclosure. For example, referring to FIG. 15, an agent 106 having logic to append indicator packets to normal packets may be implemented on an integrated circuit (IC) 108 that may include one or more processor cores 110. In another embodiment as shown in FIG. 16, an agent 112 having logic to append indicator packets to normal packets may be implemented as part of a chipset 114 that is separate from one or more processor cores 116. In such embodiments, the interconnect agent may be implemented as a memory controller or as a host for any other type of interconnect system. Likewise, an agent having logic to process or forward packets may be fabricated integral with one or more processors or as part of a separate chipset.

Figure 14:
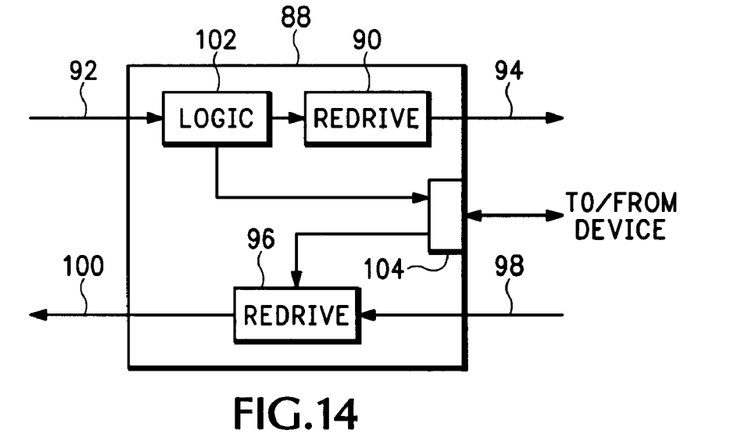
FIG. 14 illustrates another embodiment of an interconnect agent according to some of the inventive principles of this patent disclosure.

FIG. 14 illustrates another embodiment of an interconnect agent according to some of the inventive principles of this patent disclosure. The agent 88 of this embodiment includes a first redrive circuit 90 to redrive packets received on a first link 92 to a second link 94. A second redrive circuit 96 redrives packets received on a third link 98 to a fourth link 100. Decision logic 102 is coupled between the redrive circuit and a device interface 104. The logic examines incoming packets received on the first link 92 and decides whether to forward packets through redrive circuit or process them at the agent in response to the presence and number of indicator packets. Data from normal packets that are to be processed locally may be transferred to a local device through the device interface 104. Data received from the device may be sent back in the other direction by merging it into packets passing through the second redrive circuit 96.

The embodiment of FIG. 14 may be utilized in different interconnect systems and implemented with numerous different details according to the inventive principles of this patent disclosure. For example, it may be used as an advanced memory buffer (AMB) on a memory module in an FBDIMM memory system, in which case the device interface may be a memory device interface for accessing one or more DRAM devices. In an FBDIMM type of arrangement, the host may be configured to pipeline packets to the memory modules. That is, a normal packet that contain a memory request may be sent to a module, and additional requests may be sent in additional normal packets before the response packet to the first request packet is received back at the host. Alternatively, the embodiment of FIG. 14 may be implemented in a bridge between a processor and other processors, bridges or subsystems, in which case the device interface may itself be implemented as another point-to-point interconnect.

In some embodiments, the inventive principles may result in reduced power consumption. For example, depending on the implementation, the embodiment of FIG. 12 may reduce power consumption by not processing normal packets that are intended to be forwarded to a different agent.

Although the inventive principles are disclosed in the context of some specific embodiments, many variations and permutations are contemplated within the scope of these principles. For example, the embodiment of FIG. 14 may also include link interfaces (e.g., lane receivers, clock recovery circuits, drive circuits, etc.) that may be separate from or integral with the decision logic. Alternatively, the redrive circuits may be implemented to include the functions of link interfaces and the various logic.

As a further example, links may be implemented with any number of lanes, and any type of directionality. For example, in an FBDIMM implementation, the links may have 10 unidirectional lanes in the outbound direction (away from the host) and 14 unidirectional lanes in the inbound direction, but many other configurations are possible, e.g., in a PCIe implementation. In the embodiment of FIG. 11, states 0 and 1 are shown as examples, but the inventive principles are not limited to these particular details.

Logic may be implemented with hardware, software, firmware, etc., or any combination of these elements.

Although some example embodiments have been shown with a continuous path between all agents (i.e., each agent is only connected to two other agents), the inventive principles also apply to systems in which an agent may be connected to additional agents through multiple links (e.g., a packet switching arrangement).

Since the embodiments described herein may be modified in arrangement and detail without departing from the inventive principles, such changes and modifications are considered to fall within the scope of the following claims.

The invention claimed is:

1. An interconnect agent comprising:
   a first link interface to receive packets over a first point-to-point link;
   a second link interface to transmit packets over a second point-to-point link;
   logic to decide whether a normal packet received over the first link should be either processed at the agent or forwarded over the second link in response to indicator packets that accompany the normal packet;
   where the logic to decide includes logic to distinguish normal packets from indicator packets, to process a first packet at the agent if the first packet is a normal packet, and to receive a second packet over the first link and forward the second packet over the second link if the first packet is an indicator packet;

where an indicator packet comprises a progressively stripped empty indicator packet; and where the progressively stripped empty indicator packet consists of a start bit and an end bit.

2. The interconnect agent of claim 1 further comprising a redrive circuit coupled to the logic to redrive packets from the first link to the second link.

3. The interconnect agent of claim 1 further comprising a device interface coupled to the logic to transfer data from the first link to a device that may be coupled to the device interface.

4. The interconnect agent of claim 3 further comprising:

a third link interface to receive packets over a third point-to-point link; and a fourth link interface to transmit packets received on the third link over a fourth point-to-point link, and to transmit data from the device interface over the fourth link.

5. The interconnect agent of claim 4 where:

the interconnect agent comprises a memory agent; and the device interface comprises a memory device interface.

6. An interconnect agent comprising:

a first link interface to transmit packets over a first point-to-point link;

logic to append indicator packets to a normal packet to indicate the destination of the normal packet, where the number of indicator packets is associated with a number of additional agents to forward the normal packet to the destination; and where the number indicator packets appended to the normal packet is $2^m-1$, where m is the number of additional agents to forward the normal packet to the destination.

7. The interconnect agent of claim 6 further comprising a second link interface to receive packets over a second point-to-point link.

8. The interconnect agent of claim 6 where the interconnect agent is arranged to pipeline packets to a second interconnect agent.

9. The interconnect agent of claim 6 where the interconnect agent is included on an integrated circuit with one or more processor cores.

10. The interconnect agent of claim 6 where the interconnect agent is included in a chipset.

11. A system comprising:

a first interconnect agent having logic to append indicator packets to a normal packet depending on the destination of the normal packet; and a second interconnect agent coupled to the first interconnect agent through a first point-to-point link and having logic to decide whether a normal packet received over the first link should be processed at the second agent or forwarded over a second point-to-point link in response to the indicator packets, where the logic in the second agent includes:

logic to assign either a first or second logic state to all incoming packets when a first indicator packet is detected; and logic to forward all packets having the first logic state and ignore all packets having the second logic state.

12. The system of claim 11 further comprising a third interconnect agent coupled to the second interconnect agent through the second link and having logic to decide whether a normal packet received over the second link should be processed at the third agent or forwarded over a third point-to-point link in response to the indicator packets.

13. The system of claim 12 where:

the first agent comprises a memory controller;

the second agent comprises a memory module; and the third agent comprises a memory module.

14. The system of claim 11 where the logic in the second agent includes logic to distinguish normal packets from indicator packets, to process a first packet at the second agent if the first packet is the normal packet, and to receive a second packet over the first link and forward the second packet over the second link if the first packet is an indicator packet.

15. The system of claim 11 where the first indicator packet comprises an indicator packet from among the indicator packets that trails a previous normal packet.

16. An interconnect agent comprising:

a first link interface to receive packets over a first point-to-point link;

a second link interface to transmit packets over a second point-to-point link; and logic to decide whether a normal packet received over the first link should be either processed at the agent or forwarded over the second link in response to indicator packets that may accompany the normal packets;

where an indicator packet comprises a progressively stripped empty indicator packet; and where the progressively stripped empty indicator packet consists of a start bit and an end bit.

* * * * *